UNITED STATES PATENT OFFICE.

MARSHALL C. LEFFERTS, OF NEW YORK, N. Y., AND JOHN H. STEVENS, OF NEWARK, NEW JERSEY.

INK.

SPECIFICATION forming part of Letters Patent No. 380,654, dated April 3, 1888.

Application filed December 6, 1886. Serial No. 220,821. (No specimens.)

*To all whom it may concern:*

Be it known that we, MARSHALL C. LEFFERTS, of the city of New York, in the county of New York and State of New York, and JOHN H. STEVENS, of the city of Newark, in the county of Essex and State of New Jersey, citizens of the United States, have invented certain new and useful Improvements in Inks, of which the following is a specification.

Our invention relates to an improved ink for use in the process of printing upon celluloid and other solid pyroxyline compounds. As this material is of a hard, solid, and non-porous nature, ordinary printing-ink is unfit for this purpose, it not being absorbed as in the case of paper and other material, and when applied to the surface of pyroxyline compounds may be easily defaced or entirely rubbed off.

Heretofore inks that have been used for printing or decorating the surface of celluloid or analogous compounds have contained an ingredient which acted as a solvent of both the pyroxyline and the coloring material. It has been the practice to employ analine colors which have been dissolved in a liquid or mixture which is a solvent of both the analine colors and the pyroxyline compound, and such mixture has been applied to the surface by a brush or pencil or with type. One objection to this ink is that that portion of the color which remains on the surface of the material on becoming dried is easily and readily rubbed or wiped from the surface, leaving an imperfect and indistinct impression.

The object of our invention is to overcome this objection, and, further, to produce an ink in which an insoluble pigment in powdered form may be used, as in ordinary printing-inks; and with these ends in view our invention consists, first, in the employment of a gum in an ink for use in printing upon pyroxyline compounds; secondly, in the use of an insoluble pigment and a solvent of pyroxyline in an ink for use in printing upon pyroxyline compounds; and, thirdly, in an ink containing an insoluble pigment, a solvent of pyroxyline, and a gum or binding agent for holding the particles of pigments together, which ink when applied to a surface of celluloid or other pyroxyline compound effectually attaches itself in and to the surface.

The ingredients entering into the compound are: First, a solvent or a mixture which is a solvent of pyroxyline; second, a pigment or coloring material in powdered form; third, a gum, gums, or binding agent for holding the particles of pigment together.

In describing our invention, we will first state the functions or action of the ingredients entering into the compound, and under each respective head name some of the substances which may be used.

*Pigment or coloring-matter.*—In the first place it is necessary that there shall be a coloring-matter, the function of which is similar to that used in ordinary printing-inks—viz., to impart to the surface printed upon the desired color or tint. For this purpose any suitable pigment may be used, such as is commonly employed in compounding ordinary printing-inks, and which is insoluble in the liquid menstrua employed.

*Binder.*—The function or office of the binder is to hold, bind, or retain the fine particles of pigment or coloring material together in order that the particles of pigment which are fastened in the surface of the material will not separate from those remaining on the surface, and thus prevent them from being rubbed off. To effect this purpose and produce the best results, the substance used should be soluble in the menstrua or solvent employed that is capable of being dissolved in or combined therewith by the aid of heat or otherwise. The use of this binder is also a great improvement in inks in which the coloring material is soluble. Any gum—such as shellac, rosin, mastic, copal, (preferably the oxidized portion thereof, as copal or kauri dust,) &c., or such gums combined with other material, as pyroxyline—may be used. The kind and proportions of the binding agent used will depend somewhat upon the character of the printing to be done—as, for instance, in inks for use in plate-printing it is preferable to employ gums which will allow the ink to "wipe" smoothly from the polished surface of the plate, as shellac, and in inks to be used for type-printing a more adhesive gum, as mastic, rosin, or copal, and in greater proportions, is preferable. We have found that by using a portion of shellac and pyroxyline in inks for use in the former character of printing better results are obtained than by the use of shellac alone. To any one or more of these substances may be added, if desired, camphor, which unites with the binder to form a solid agent for the color, and which from its nature also assists in the solvent action. Castor-oil may also be added to assist in the operation of the gum or gums used as a binder, which further serves to render the ink smooth.

*Solvents.*—The office or function of the solvent is to penetrate the material and serve as a vehicle for carrying the color and fastening it on or to the surface thereof. With regard to the liquid menstrua which might be used, it is desirable that they be of a low volatility, and either in themselves solvents of the pyroxyline compound or of such a nature that when combined with the other ingredients a mixture which operates as a solvent will be formed—as, for instance, oil of cassia may be used, which in itself is a solvent of both pyroxyline and pyroxyline compounds, or oil of sassafras may be used, which, though in itself not a solvent of pyroxyline, and only under certain conditions a solvent of the compound, yet when combined with the camphor used as an auxiliary binder renders the mixture an effective solvent. By preference we use such substances as oil of cassia, oil of sassafras, nitro-benzole, oil of pennyroyal, oil of fennel seed, oil of cherry-laurel, heavy oil of cinnamon, and oil of hyssop. Some of the lighter solvents may also be used in connection with the above, such as fusel-oil, wood-spirits, grain-alcohol, &c., which not only act as solvents, but also serve to prevent the ink from becoming too thick or adhesive. The tendency of alcohol is also to cut the gum or gums and prevent its settling when slow in dissolving. In selecting the ingredient or ingredients for this purpose care should be taken to employ those substances not likely to cause separation of the ingredients in the compounds. It sometimes happens in mixing an ink for use in plate-printing that the materials have such a tendency after being compounded. In such case the ink may usually be restored to its normal condition by regrinding and at the same time adding a little fusel-oil. Oil of cloves may be employed in an ink for use in plate-printing, and combines readily with the other ingredients, but after having stood a length of time exhibits this tendency to separate. When such substance, or other substances exhibiting a like tendency, is employed, castor-oil and wood-spirits should be omitted and the fusel-oil used in greater proportion. As above stated, it is desirable that the substances used for this office be of a slow-drying nature by virtue of which property they will keep the ink in a moist condition for a long time, producing an action somewhat similar to that of linseed-oil used in the preparation of common engraving or printing ink.

Our improved ink, produced as above described, possesses many advantages over those heretofore compounded for use on pyroxyline material, its chief and most important characteristic being that that portion which remains on the surface of the material is capable of being so hardened or baked as to resist a great amount of rubbing without being defaced. In using this ink for printing from engraved plates we prefer to employ heat and pressure, which are applied to the plate and material, the effect being that the ink partially penetrates the surface of the material, while that portion remaining on the surface is baked or hardened, so as to form a hard durable surface. This property of the ink distinguishes it from all other mixtures or inks of which we know.

The proportionate quantities of the ingredients used in compounding the ink will depend somewhat upon the nature or character of the printing to be done and upon whether the ink is to be used in plate-printing, type or surface printing.

For plate-printing the following proportions may be used with good results:

*Pigment.*—Any suitable pigment as used in ordinary printing or engraving inks, the amount and color, respectively, depending upon the consistency and color desired.

*Gums or binder.*—By weight, shellac, four parts; pyroxyline, one-fifth part; camphor, eight parts; castor-oil, two parts.

*Solvents.*—By weight, oil of cassia, ten parts; fusel-oil, two parts; wood-spirits, two parts.

Heretofore in attempting to color or decorate the surface of pyroxyline compounds inks or dyes have been employed which necessitate the drying of the surface after the application of the color. By means of our improved ink, when used in connection with heat and pressure, as above stated, a hard and permanent impression is produced, and the printed sheets or articles may be piled together immediately after they are taken from the press.

In compounding the ink for use in type-printing, it is especially desirable that the mixture be of a slow-drying nature, as the ink is spread over a large surface, and the entire quantity applied to the type used up, the large surface upon which the ink is spread allowing or permitting of a rapid evaporation of the volatile ingredients, whereas in inks for use in plate-printing, though desirable to use slow-drying substances, yet it is not so essential, for the reason that a fresh supply of ink is applied to the plate at each impression taken thereform, the excess of ink, as is well understood, being wiped off at each operation. It is also desirable that the ink for use in type-printing be of a more adhesive nature to prevent spreading. For this character of printing, the following ingredients may be used with good results:

*Pigment.*—Any suitable pigment, as used in ordinary printing or engraving inks, the amount and color, respectively, depending upon the consistency and color desired.

*Gums or binder.*—By weight, gum mastic or rosin, two parts; camphor, one part.

*Solvent.*—Oil of cassia, one part.

After the printed article upon which the ink has been used is delivered from the press little or no drying will be found necessary, as the ink is of such nature as to rapidly harden on the material employed.

The compounding of our improved ink is best effected by combining the heavy solvents and binding agents at an elevated temperature, after which the lighter solvents may be added, and the mixture then ground with the pigment in the usual manner for making printing-inks.

The nature and functions of the different ingredients being understood, many equivalent substances or agents which produce similar effects upon pyroxyline compounds and equivalent substances to be used for those referred to as binding agents will suggest themselves to persons skilled in the art, and which may be used with good results, and although we have mentioned only the preferred ingredients we do not intend to limit our invention to those we have specified.

We intend to use any and all known substances or agents which it is possible to use in lieu of those hereinbefore specifically mentioned. In specifying the pigments and solvents and gums, simple and compound, and in describing their use in certain quantities and proportions we have not intended to limit our claim. On the contrary, we are fully aware that other substances and other mixtures and other quantities and proportions than those hereinbefore mentioned may be used with satisfactory results; and we intend that our claims, hereinafter formulated, shall cover and include, broadly, an ink for use in printing upon pyroxyline compounds, in which there shall be used in efficient proportions an insoluble pigment or coloring material, a gum or combination of gums for holding the particles of pigment together, and a solvent or mixture which is a solvent of the pyroxyline compound upon which the ink is to be applied. It is obvious that numerous ingredients may be added—such as camphor, castor-oil, fusel-oil, and other materials—the natures of which are understood, to add to the efficiency of the ink without impairing its value by reason of the presence of the three important constituents of which it is chiefly composed. By the term "insoluble pigment," as used in our claims, we mean any substance or compound or combination of substances which is insoluble in the menstrua employed. By the term "gum" we mean any gum or combination of gums or substance containing a gum or gums in efficient proportions, and by the term "solvent" we mean any substance or compound or combination of substances which, when the ink is applied to the surface of the pyroxyline compound, will act as a solvent thereof; and by the term "volatile oil," as used in our claims, we mean an essential oil of the nature of those hereinbefore described.

We are aware that certain solvents of nitrocellulose have been employed in the manufacture of celluloid, such solvents being enumerated in several patents granted to one of us— to wit, to John H. Stevens, of Newark, New Jersey, and dated December 19, 1882—but we are not aware that an ink has ever before been made in which a solvent of pyroxyline has been used as a vehicle for the coloring material in a powdered form, or that an ink has ever before been compounded for use upon pyroxyline materials containing the pigment or coloring-matter in a powdered form, or that any ink for this purpose has ever before been compounded in which a binder has been used as an element; and therefore

What we claim as our invention, and desire to secure by Letters Patent, is—

1. An ink for use in printing upon celluloid or other pyroxyline compounds, consisting, essentially, of insoluble pigment in powdered form, a solvent of the pyroxyline compound, and a gum for binding the particles of pigment together.

2. An ink for use in printing upon celluloid or other pyroxyline compounds, consisting, essentially, of insoluble pigment in powdered form, a gum for holding the particles of pigment together, and a volatile oil which is or becomes a solvent of the pyroxyline compound.

3. An ink for use in printing upon celluloid or other pyroxyline compounds, consisting, essentially, of insoluble pigment in powdered form, a gum for holding the particles thereof together, and a solvent consisting, essentially, of oil of cassia.

4. An ink for use in printing upon celluloid or other pyroxyline compounds, consisting, essentially, of insoluble pigment in powdered form, shellac, and a solvent of the pyroxyline compound.

5. An ink for use in printing upon celluloid or other pyroxyline compounds, consisting, essentially, of insoluble pigment in powdered form, shellac, and a solvent consisting, essentially, of oil of cassia.

Signed at Newark, in the county of Essex and State of New Jersey, this 29th day of November, A. D. 1886.

MARSHALL C. LEFFERTS.
JOHN H. STEVENS.

Witnesses:
ISAAC F. ROE,
ABRAHAM MANNERS.